US008462230B2

United States Patent
Hsieh

(10) Patent No.: US 8,462,230 B2
(45) Date of Patent: Jun. 11, 2013

(54) CIRCUIT FOR AUTOMATICALLY DETECTING IMAGE FLICKER AND METHOD THEREOF

(75) Inventor: Hong-Yeh Hsieh, Taipei (TW)

(73) Assignee: Etron Technology, Inc., Hsinchu (TW)

( * ) Notice: Subject to any disclaimer, the term of this patent is extended or adjusted under 35 U.S.C. 154(b) by 51 days.

(21) Appl. No.: 13/231,975

(22) Filed: Sep. 14, 2011

(65) Prior Publication Data
US 2012/0081570 A1   Apr. 5, 2012

Related U.S. Application Data

(60) Provisional application No. 61/388,621, filed on Oct. 1, 2010.

(30) Foreign Application Priority Data

May 6, 2011   (TW) .............................. 100116024 A

(51) Int. Cl.
H04N 9/73   (2006.01)
(52) U.S. Cl.
USPC .................................... 348/228.1; 348/226.1
(58) Field of Classification Search
USPC ................. 348/226.1, 227.1, 228.1
See application file for complete search history.

(56) References Cited

U.S. PATENT DOCUMENTS

| | | | | |
|---|---|---|---|---|
| 2004/0201729 A1* | 10/2004 | Poplin et al. | ............... | 348/226.1 |
| 2007/0153094 A1* | 7/2007 | Noyes et al. | ............... | 348/226.1 |
| 2007/0182831 A1* | 8/2007 | Katoh et al. | ............... | 348/226.1 |

FOREIGN PATENT DOCUMENTS

CN   101567977 A   10/2009

* cited by examiner

*Primary Examiner* — Tuan Ho
*Assistant Examiner* — Zhenzhen Wu
(74) *Attorney, Agent, or Firm* — Winston Hsu; Scott Margo

(57) ABSTRACT

A circuit for automatically detecting image flicker includes an image sensor, an average unit, a difference generation unit, a transform unit, and a flicker detection unit. The image sensor captures an image frame. The average unit generates a luminance average value according to a luminance sum of predetermined pixels of each pixel row of an image frame. The difference generation unit generates a corresponding difference according to a luminance average value of each pixel row of two consecutive image frames. The transform unit performs a discrete Fourier transform on a difference corresponding to a corresponding pixel row of the two consecutive image frames to generate a transform result. The flicker detection unit determines whether a flicker is shown in the two consecutive image frames to generate a detection result according to the transform result.

13 Claims, 6 Drawing Sheets

CIRCUIT FOR AUTOMATICALLY DETECTING IMAGE FLICKER AND METHOD THEREOF

CROSS REFERENCE TO RELATED APPLICATIONS

This application claims the benefit of U.S. Provisional Application No. 61/388,621, filed on Oct. 1, 2010 and entitled "Flicker Detection and Compensation for CMOS Image Sensor," the contents of which are incorporated herein by reference.

BACKGROUND OF THE INVENTION

1. Field of the Invention

The present invention is related to a detecting circuit and method thereof, and particularly to a circuit and method thereof that can automatically detect image flicker.

2. Description of the Prior Art

In the prior art, an image sensor manufacturer usually pre-sets an exposure setting of an image sensor to a predetermined value before the image sensor is produced. Because a flicker frequency of interior lighting varies with different alternating current frequencies, the predetermined value may be different from the flicker frequency of the interior lighting. If the flicker frequency of the interior lighting is different from the predetermined value, a user may observe flicker shown in consecutive image frames captured by the image sensor when the user previews the consecutive image frames, resulting in quality of the consecutive image frames captured by the image sensor being lowered.

SUMMARY OF THE INVENTION

An embodiment provides a circuit for automatically detecting image flicker. The circuit includes an image sensor, an average unit, a difference generation unit, a transform unit, and a flicker detection unit. The image sensor is used for capturing an image frame according to an exposure setting. The average unit is coupled to the image sensor for generating a luminance average value corresponding to each pixel row according to a luminance sum of predetermined pixels of the pixel row of the image frame. The difference generation unit is coupled to the average unit for generating a difference corresponding to each corresponding pixel rows of two consecutive image frames captured by the image sensor according to a luminance average value of a pixel row of a first image frame of the two consecutive image frames and a luminance average value of a corresponding pixel row of a second image frame of the two consecutive image frames. The transform unit is used for performing a discrete Fourier transform on the difference corresponding to the corresponding pixel rows of the two consecutive image frames to generate a transformation result. The flicker detection unit is coupled to the transform unit for determining whether flicker is shown in the two consecutive image frames to generate a detection result according to the transformation result.

An embodiment provides a method for automatically detecting image flicker. The method includes capturing an image frame according to an exposure setting; generating a luminance average value corresponding to each pixel row according to a luminance sum of predetermined pixels of the pixel row of the image frame; generating a difference corresponding to each corresponding pixel rows of two consecutive image frames captured by the image sensor according to a luminance average value of a pixel row of a first image frame of the two consecutive image frames and a luminance average value of a corresponding pixel row of a second image frame of the two consecutive image frames; performing a discrete Fourier transform on the difference corresponding to the corresponding pixel rows of the two consecutive image frames to generate a transformation result; determining whether flicker is shown in the two consecutive image frames to generate a detection result according to the transformation result.

The present invention provides a circuit for automatically detecting the image flicker and method thereof. The circuit and the method utilize an average unit and a difference generation unit to generate a difference corresponding to each pixel row of two consecutive image frames according to the two consecutive image frames captured by an image sensor. Then, a transform unit performs a discrete Fourier transform on a difference corresponding to each pixel row of the two consecutive image frames to generate a transformation result. A flicker detection unit determines whether flicker is shown in the two consecutive image frames according to the transform result. An auto exposure unit adjusts an exposure setting according to a detection result generated by the flicker detection unit to prevent the two consecutive image frames from showing the flicker. Therefore, the present invention can automatically detect image flicker to adjust the exposure setting of the auto exposure unit when the circuit for automatically detecting image flicker is powered on or the flicker frequency of the interior lighting varies severely. However, the present invention can also automatically detect image flicker to adjust the exposure setting of the auto exposure unit every predetermined interval after the circuit is powered on. In addition, the transform unit and the flicker detection unit can be realized by software to reduce design complexity of the circuit for automatically detecting image flicker.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating the peak group of the transformation result being zoomed in.

DETAILED DESCRIPTION

Figure 1A:
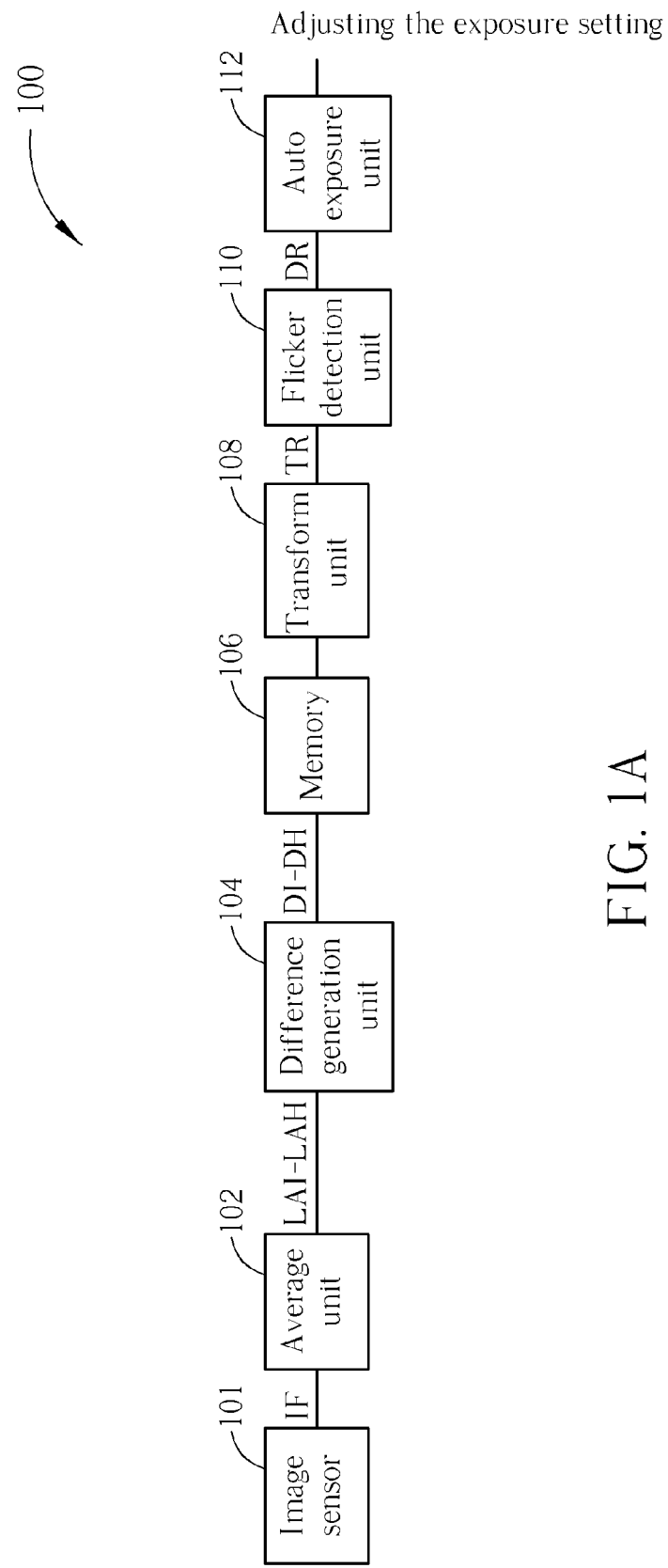
FIG. 1A is a diagram illustrating a circuit for automatically detecting image flicker according to an embodiment.
Figure 1B:
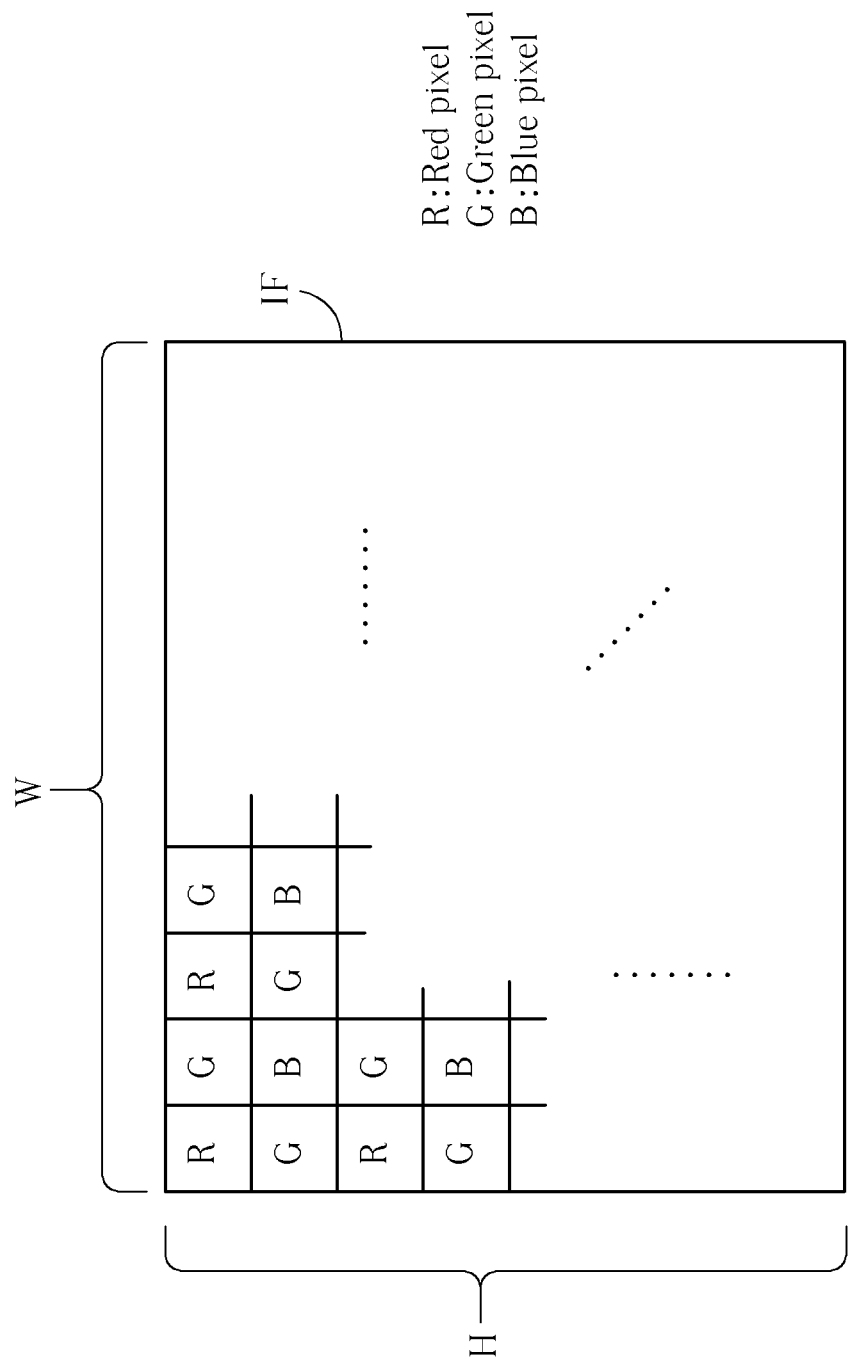
FIG. 1B is a diagram illustrating an image frame having a Bayer pattern.

Please refer to FIG. 1A and FIG. 1B. FIG. 1A is a diagram illustrating a circuit 100 for automatically detecting image flicker according to an embodiment, and FIG. 1B is a diagram illustrating an image frame having a Bayer pattern. The circuit 100 includes an image sensor 101, an average unit 102, a difference generation unit 104, a memory 106, a transform unit 108, a flicker detection unit 110, and an auto exposure unit 112. The image sensor 101 is used for capturing an image frame IF according to an exposure setting (such as 50 Hz), where width of the image frame IF is W pixels, height of the image frame IF is H pixels, and a flicker frequency of interior lighting is 60 Hz. But, the present invention is not limited to the exposure setting being 50 Hz and the flicker frequency of the interior lighting being 60 Hz. The average unit 102 is coupled to the image sensor 101 for generating a luminance average value corresponding to each pixel row according to a luminance sum of predetermined pixels of each pixel row of the image frame IF. In addition, because human eyes are more sensitive to green pixels, the predetermined pixels of each pixel row are green pixels of each pixel row. But, the present invention is not limited to the predetermined pixels of each pixel row being green pixels of each pixel row. As shown in FIG. 1B, the image frame IF has the Bayer pattern. Therefore, the average unit 102 generates H luminance average values LA1 to LAH according to green pixels of each pixel row of the image frame IF. In addition, in order to reduce operation loading of the average unit 102, a sample number of green pixels of each pixel row can be 64, 128, 256, or 512.

Figure 2:
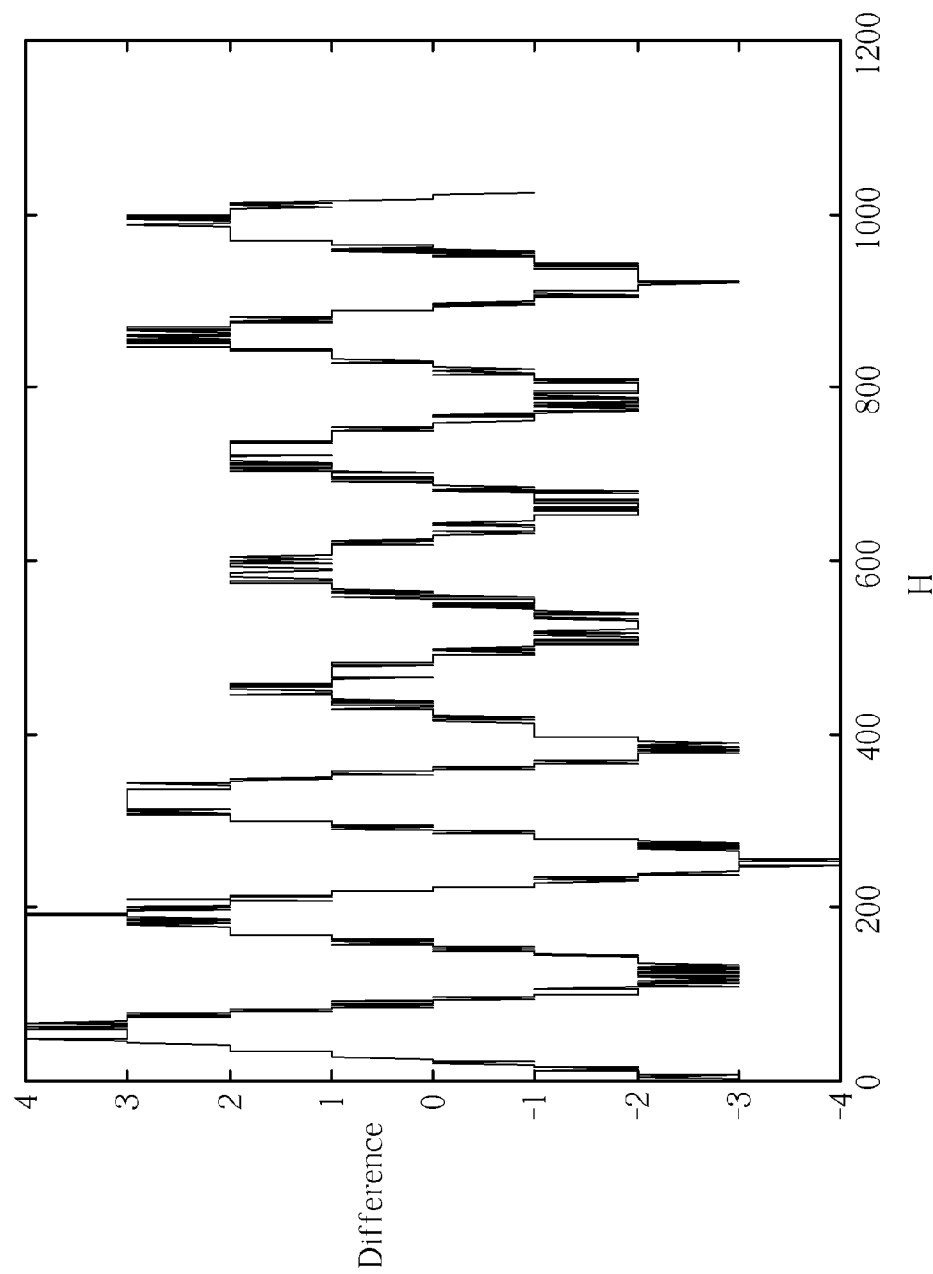
FIG. 2 is a diagram illustrating a difference corresponding to each pixel row of two consecutive image frames.
Figure 3:
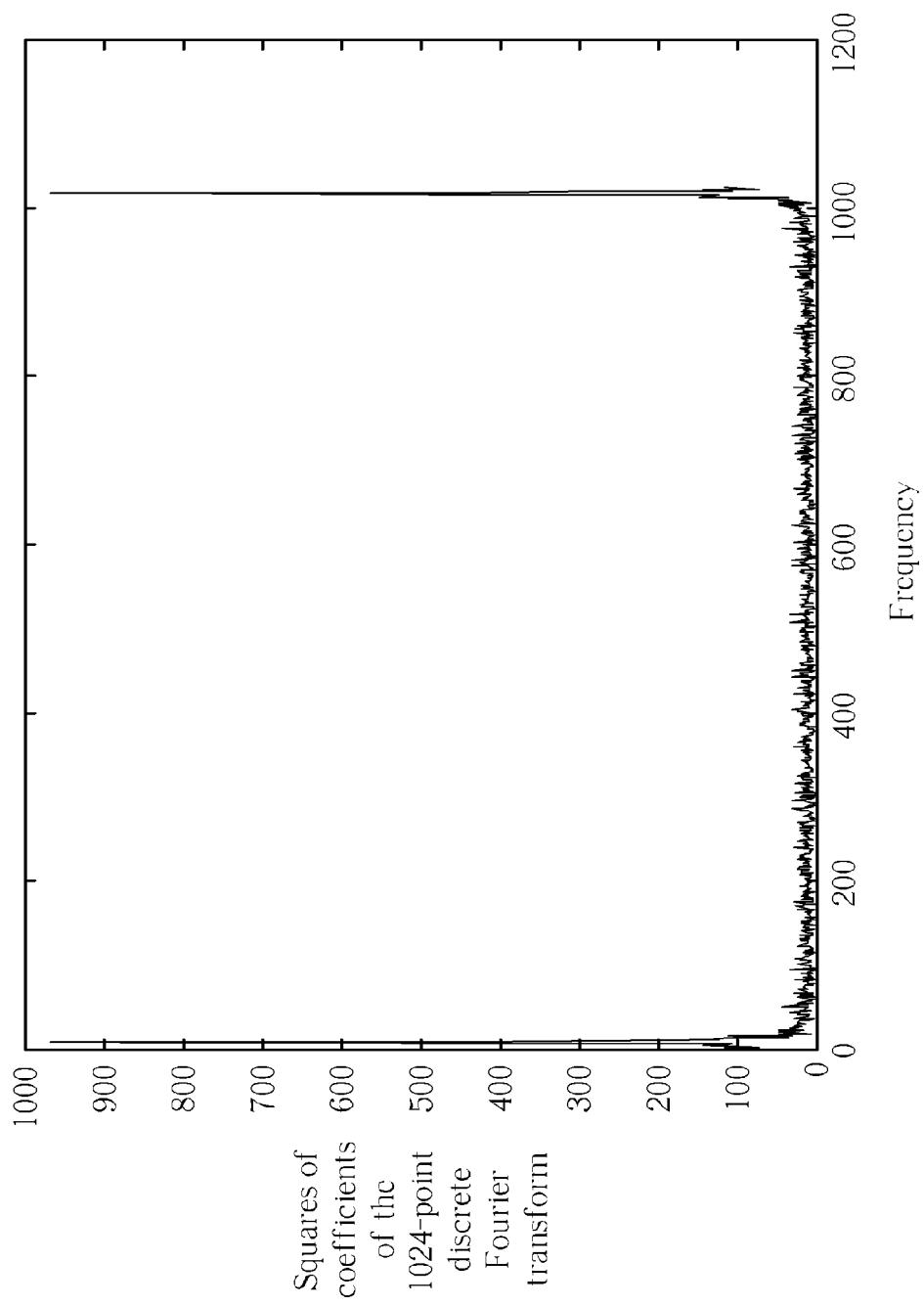
FIG. 3 is a diagram illustrating a transformation result.
Figure 4:
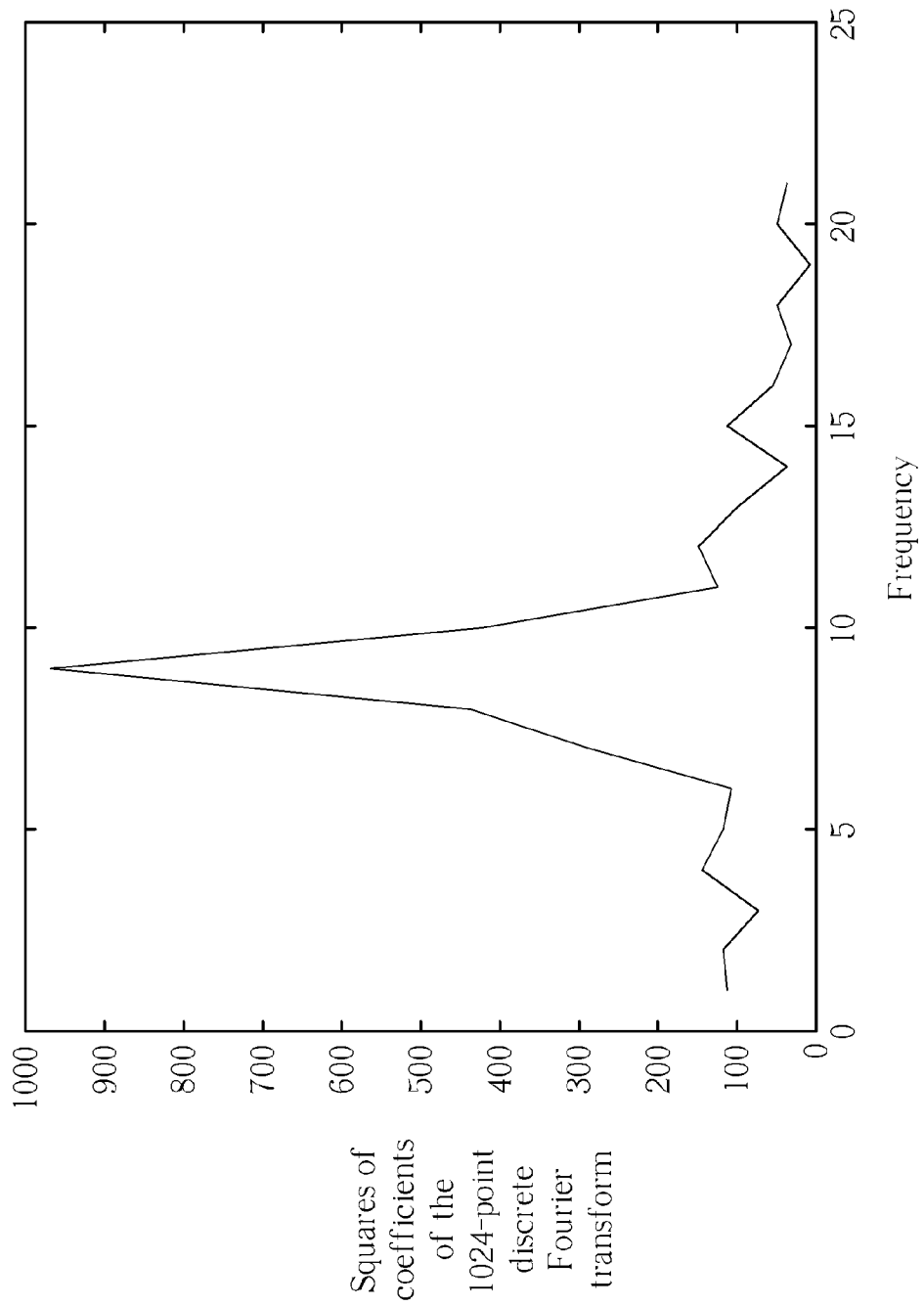

Please refer to FIG. 1A, FIG. 2, and FIG. 3. FIG. 2 is a diagram illustrating a difference corresponding to each pixel row of two consecutive image frames, and FIG. 3 is a diagram illustrating a transformation result TR. The difference generation unit 104 is used for generating a difference corresponding to a pixel row of a first image frame of two consecutive image frames captured by the image sensor 101 and a corresponding pixel row of a second image frame of the two consecutive image frames according to a luminance average value of the pixel row of the first image frame and a luminance average value of the corresponding pixel row of the second image frame. For example, the difference generation unit 104 generates a difference corresponding to first pixel rows of the two consecutive image frames according to a luminance average value of the first pixel row of the first image frame of the two consecutive image frames and a luminance average value of the first pixel row of the second image frame of the two consecutive image frames. Therefore, the difference generation unit 104 can generate differences D1 to DH corresponding to each pixel row of the two consecutive image frames. The memory 106 is used for storing the differences D1 to DH corresponding to each pixel row of the two consecutive image frames. As shown in FIG. 2, the differences D1 to DH corresponding to each pixel row of the two consecutive image frames vary periodically, where a vertical axis in FIG. 2 represents values of the differences D1 to DH, a horizontal axis in FIG. 2 represents height H of an image frame, and H is 1024. But, the present invention is not limited to H being 1024. The transform unit 108 is used for reading the differences D1 to DH corresponding to each pixel row of the two consecutive image frames from the memory 106, and performing a 1024-point discrete Fourier transform on the differences D1 to DH corresponding to each pixel row of the two consecutive image frames to generate a transformation result TR (as shown in FIG. 3). As shown in FIG. 3, when the flicker frequency of the interior lighting is different from the exposure setting of the image sensor 101, the transformation result TR shows two peaks (due to a symmetrical characteristic of the discrete Fourier transform), where a vertical axis in FIG. 3 represents squares of coefficients of the 1024-point discrete Fourier transform, and a horizontal axis in FIG. 3 represents frequency. When the flicker frequency of the interior lighting is the same as the exposure setting of the image sensor, the transformation result TR does not show the peaks. Therefore, the flicker detection unit 110 can determine whether flicker appears in the two consecutive image frames according to the transformation result TR by the 1024-point discrete Fourier transform converting the differences D1 to DH corresponding to each pixel row of the two consecutive image frames to a frequency domain. As shown in FIG. 3, because the flicker frequency of the interior lighting is 120 Hz (60 Hz*2), $8^{th}$ and $9^{th}$ discrete Fourier transform coefficients (1024/120=8.53) are greater. But, the present invention is not limited to the 1024-point discrete Fourier transform. In addition, because absolute values of the differences D1 to DH corresponding to each pixel row of the two consecutive image frames are small, noise received by the image sensor 101 may interfere with the transformation result TR. Therefore, based on the above mentioned reason, when the flicker detection unit 110 analyzes the transformation result TR, the flicker detection unit 110 chooses a peak group instead of a single peak to determine whether the flicker appears in the two consecutive image frames. In addition, due to the symmetrical characteristic of the discrete Fourier transform, two peaks are shown in FIG. 3. Please refer to FIG. 4. FIG. 4 is a diagram illustrating the peak group of the transformation result TR being zoomed in, where a vertical axis in FIG. 4 represents the squares of the coefficients of the 1024-point discrete Fourier transform, and a horizontal axis in FIG. 4 represents frequency. As shown in FIG. 4, the peak group includes $6^{th}$ to $10^{th}$ discrete Fourier transform coefficients. The flicker detection unit 110 can determine the flicker shown in the two consecutive image frames according to the transformation result TR and generate a detection result DR. The auto exposure unit 112 is coupled to the flicker detection unit 110 for adjusting the exposure setting according to the detection result DR. That is to say, the auto exposure unit 112 adjusts the exposure setting from 50 Hz to the flicker frequency of the interior lighting (60 Hz).

As shown in FIG. 2, because the differences D1 to DH corresponding to each pixel row of the two consecutive image frames vary with a period T, a user can roughly estimate a location of the peak group of the transformation result TR according to the differences D1 to DH corresponding to each pixel row of the two consecutive image frames. For example, the period T of the differences D1 to DH corresponding to each pixel row of the two consecutive image frames is 128, so the $8^{th}$ discrete Fourier transform coefficient (1024/128=8) is the greatest. Thus, the flicker detection unit 110 can estimate the peak group of the transformation result TR includes the $6^{th}$ to the $10^{th}$ discrete Fourier transform coefficients. In order to increase the performance of the transform unit 108, the transform unit 108 may perform the 1024-point discrete Fourier transform on the difference D1 to DH corresponding to each pixel row of the two consecutive image frames, but only calculate the $6^{th}$ to the $10^{th}$ discrete Fourier transform coefficients using Goertzel algorithm. Because the transform unit 108 need not to calculate all the discrete Fourier transform coefficients, the operation speed of the transform unit 108 can be increased.

In addition, in another embodiment of the present invention, the transform unit 108 and the flicker detection unit 110 can be realized by software to reduce design complexity of the circuit 100.

Figure 5:
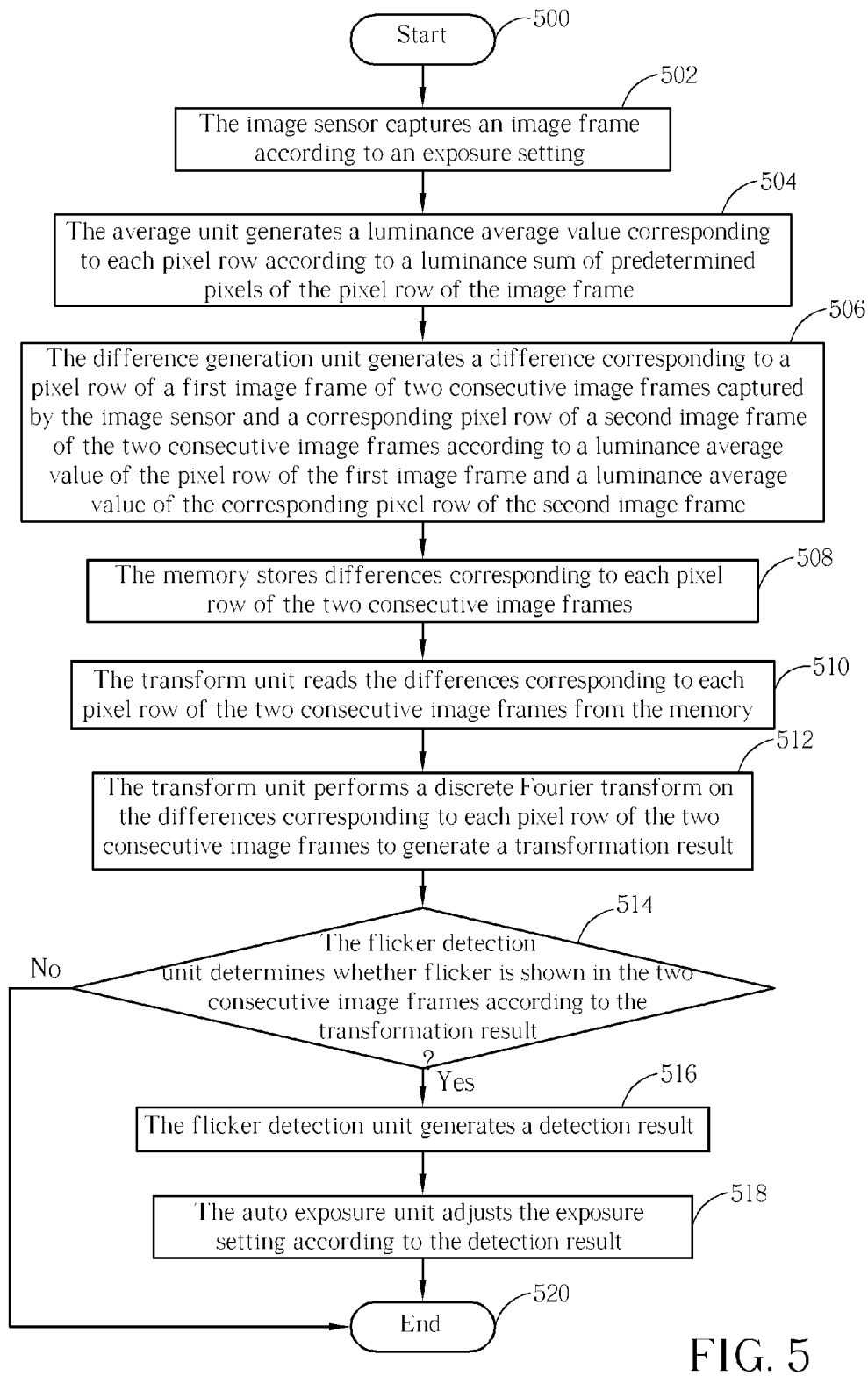
FIG. 5 is a flowchart illustrating a method for automatically detecting image flicker according to another embodiment.

Please refer to FIG. 5. FIG. 5 is a flowchart illustrating a method for automatically detecting image flicker according to another embodiment. The method in FIG. 5 is illustrated using the circuit 100 in FIG. 1A. Detailed steps are as follows:

Step 500: Start.

Step 502: The image sensor 101 captures an image frame according to an exposure setting.

Step 504: The average unit 102 generates a luminance average value corresponding to each pixel row according to a luminance sum of predetermined pixels of the pixel row of the image frame.

Step 506: The difference generation unit 104 generates a difference corresponding to a pixel row of a first image frame of two consecutive image frames captured by the image sensor 101 and a corresponding pixel row of a second image frame of the two consecutive image frames according to a luminance average value of the pixel row of the first image frame and a luminance average value of the corresponding pixel row of the second image frame.

Step 508: The memory 106 stores differences D1 to DH corresponding to each pixel row of the two consecutive image frames.

Step 510: The transform unit 108 reads the differences D1 to DH corresponding to each pixel row of the two consecutive image frames from the memory 106.

Step 512: The transform unit 108 performs a discrete Fourier transform on the differences D1 to DH corresponding to each pixel row of the two consecutive image frames to generate a transformation result TR.

Step 514: The flicker detection unit 110 determines whether flicker is shown in the two consecutive image frames according to the transformation result TR. If yes, go to Step 516; if no, go to Step 520.

Step 516: The flicker detection unit 110 generates a detection result DR.

Step 518: The auto exposure unit 112 adjusts the exposure setting according to the detection result DR.

Step 520: End.

In Step 502, width of the image frame is W pixels, height of the image frame is H pixels, and the image frame has the Bayer pattern. In Step 504, the average unit 102 generates a luminance average value corresponding to each pixel row according to a luminance sum of green pixels of the pixel row of the image frame. But, the present invention is not limited to the predetermined pixels of the pixel row being the green pixels of the pixel row. In addition, in order to reduce the operation loading of the average unit 102, a sample number of green pixels of each pixel row can be 64, 128, 256, or 512. In Step 512, because the differences D1 to DH corresponding to each pixel row of the two consecutive image frames vary periodically, the user can roughly estimate a location of a peak group of the transformation result TR according to the differences D1 to DH corresponding to each pixel row of the two consecutive image frames. Therefore, the transform unit 108 may perform the 1024-point discrete Fourier transform on the difference D1 to DH corresponding to each pixel row of the two consecutive image frames, but only calculate the $6^{th}$ to the $10^{th}$ discrete Fourier transform coefficients using Goertzel algorithm. Because the transform unit 108 need not to calculate all the discrete Fourier transform coefficients, the operation speed of the transform unit 108 can be increased. In Step 514, when the flicker frequency of the interior lighting is different from the exposure setting of the image sensor 101, the transformation result TR shows a peak; when the flicker frequency of the interior lighting is the same as the exposure setting of the image sensor 101, the transformation result TR does not show the peak. Therefore, the flicker detection unit 110 can determine whether the flicker is shown in the two consecutive image frames according to the transformation result TR. As shown in FIG. 3, because the flicker frequency of the interior lighting is different from the exposure setting of the image sensor 101, $8^{th}$ and $9^{th}$ discrete Fourier transform coefficients (1024/120=8.53) are greatest. In Step 516, the flicker detection unit 110 generates the detection result DR according to the transformation result TR. In Step 518, the auto exposure unit 112 can adjust the exposure setting according to the detection result DR.

To sum up, the circuit for automatically detecting the image flicker and method thereof utilize the average unit and the difference generation unit to generate a difference corresponding to each pixel row of two consecutive image frames according to the two consecutive image frames captured by the image sensor. Then, the transform unit performs the discrete Fourier transform on a difference corresponding to each pixel row of the two consecutive image frames to generate a transformation result. The flicker detection unit determines whether flicker is shown in the two consecutive image frames according to the transform result. The auto exposure unit adjusts the exposure setting according to a detection result generated by the flicker detection unit to prevent the two consecutive image frames from showing the flicker. Therefore, the present invention can automatically detect image flicker to adjust the exposure setting of the auto exposure unit when the circuit for automatically detecting image flicker is powered on or the flicker frequency of the interior lighting varies severely. However, the present invention can also automatically detect image flicker to adjust the exposure setting of the auto exposure unit every predetermined interval after the circuit is powered on. In addition, the transform unit and the flicker detection unit can be realized by software to reduce the design complexity of the circuit for automatically detecting image flicker.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for automatically detecting image flicker, the circuit comprising:
    an image sensor for capturing an image frame according to an exposure setting;
    an average unit coupled to the image sensor for generating a luminance average value corresponding to each pixel row according to a luminance sum of predetermined pixels of the pixel row of the image frame, wherein the predetermined pixels of the pixel row are green pixels of the pixel row;
    a difference generation unit coupled to the average unit for generating a difference corresponding to each corresponding pixel rows of two consecutive image frames captured by the image sensor according to a luminance average value of a pixel row of a first image frame of the two consecutive image frames and a luminance average value of a corresponding pixel row of a second image frame of the two consecutive image frames;
    a transform unit for performing a discrete Fourier transform on the difference corresponding to the corresponding pixel rows of the two consecutive image frames to generate a transformation result; and
    a flicker detection unit coupled to the transform unit for determining whether flicker is shown in the two consecutive image frames to generate a detection result according to the transformation result.

2. The circuit for automatically detecting image flicker of claim 1, further comprising:
    an auto exposure unit coupled to the flicker detection unit for adjusting the exposure setting according to the detection result.

3. The circuit for automatically detecting image flicker of claim 1, further comprising:
    a memory for storing the difference corresponding to the corresponding pixel rows of the two consecutive image frames.

4. The circuit for automatically detecting image flicker of claim 3, wherein the transform unit is further used for reading the difference corresponding to the corresponding pixel rows of the two consecutive image frames from the memory.

5. The circuit for automatically detecting image flicker of claim 1, wherein the flicker detection unit generates the detection result when the flicker is shown in the two consecutive image frames.

6. The circuit for automatically detecting image flicker of claim 1, wherein the transform unit determines to calculate a discrete Fourier transform coefficient of a predetermined difference of the difference according to the difference corresponding to the corresponding pixel rows of the two consecutive image frames.

7. The circuit for automatically detecting image flicker of claim 1, wherein the first image frame and the second image frame are Bayer pattern image frames.

8. A method for automatically detecting image flicker, the method comprising:
capturing an image frame according to an exposure setting;
generating a luminance average value corresponding to each pixel row according to a luminance sum of predetermined pixels of the pixel row of the image frame, wherein the predetermined pixels of the pixel row are green pixels of the pixel row;
generating a difference corresponding to each corresponding pixel rows of two consecutive image frames captured by the image sensor according to a luminance average value of a pixel row of a first image frame of the two consecutive image frames and a luminance average value of a corresponding pixel row of a second image frame of the two consecutive image frames;
performing a discrete Fourier transform on the difference corresponding to the corresponding pixel rows of the two consecutive image frames to generate a transformation result; and
determining whether flicker is shown in the two consecutive image frames to generate a detection result according to the transformation result.

9. The method of claim 8, further comprising:
generating the detection result when the flicker is shown in the two consecutive image frames.

10. The method of claim 8, further comprising:
adjusting the exposure setting according to the detection result.

11. The method of claim 8, further comprising:
storing the difference corresponding to the corresponding pixel rows of the two consecutive image frames.

12. The method of claim 8, further comprising:
determining to calculate a discrete Fourier transform coefficient of a predetermined difference of the difference according to the difference corresponding to the corresponding pixel rows of the two consecutive image frames.

13. The method of claim 8, wherein the first image frame and the second image frame are Bayer pattern image frames.

* * * * *